US011518122B2

(12) United States Patent
Agarwal et al.

(10) Patent No.: US 11,518,122 B2
(45) Date of Patent: Dec. 6, 2022

(54) MAGNETIC TIRE SEALANT FOR PUNCTURE DETECTION

(71) Applicant: Bridgestone Americas Tire Operations, LLC, Nashville, TN (US)

(72) Inventors: Sheel P. Agarwal, Solon, OH (US); Terence E. Wei, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 654 days.

(21) Appl. No.: 15/780,699

(22) PCT Filed: Dec. 1, 2016

(86) PCT No.: PCT/US2016/064431
§ 371 (c)(1),
(2) Date: Jun. 1, 2018

(87) PCT Pub. No.: WO2017/105861
PCT Pub. Date: Jun. 22, 2017

(65) Prior Publication Data
US 2018/0345609 A1  Dec. 6, 2018

Related U.S. Application Data

(60) Provisional application No. 62/267,968, filed on Dec. 16, 2015.

(51) Int. Cl.
*B60C 19/12* (2006.01)
*B29D 30/06* (2006.01)
*B29C 73/22* (2006.01)
*B29C 73/16* (2006.01)
*B60C 25/00* (2006.01)
*B29L 30/00* (2006.01)

(52) U.S. Cl.
CPC ............ *B29C 73/22* (2013.01); *B29C 73/163* (2013.01); *B29D 30/0681* (2013.01); *B29D 30/0685* (2013.01); *B60C 19/122* (2013.01); *B60C 25/007* (2013.01); *B29D 2030/0682* (2013.01); *B29D 2030/0686* (2013.01); *B29K 2995/0008* (2013.01); *B29L 2030/00* (2013.01)

(58) Field of Classification Search
CPC ..... B60C 19/12; B60C 19/122; B60C 19/125; B60C 19/127; B29D 30/0685; B29D 30/0686; B29D 30/0697
See application file for complete search history.

(56) References Cited

U.S. PATENT DOCUMENTS

| | | | |
|---|---|---|---|
| 2,756,801 A | 7/1956 | Iknayan et al. | |
| 2,765,018 A | 10/1956 | Connell et al. | |
| 3,048,509 A | 8/1962 | Sweet et al. | |
| 3,981,342 A * | 9/1976 | Farber | B29D 30/0685 106/33 |
| 4,476,455 A | 10/1984 | Kawakami | |
| 4,918,976 A | 4/1990 | Fogal, Sr. | |
| 5,006,844 A | 4/1991 | Ohta et al. | |
| 5,693,690 A * | 12/1997 | Hayashi | C08K 3/22 523/210 |
| 6,885,111 B2 | 4/2005 | Volpi | |
| 6,888,471 B2 | 5/2005 | Elsner et al. | |
| 6,959,592 B2 | 11/2005 | Caretta | |
| 7,032,443 B2 | 4/2006 | Moser | |
| 7,551,992 B2 | 6/2009 | Kitano | |
| 7,604,029 B2 | 10/2009 | Myatt | |
| 7,882,732 B2 | 2/2011 | Haralampu et al. | |
| 7,891,393 B1 | 2/2011 | Czamo | |
| 7,997,128 B2 | 8/2011 | Robert et al. | |
| 8,616,049 B2 | 12/2013 | Jongsma et al. | |
| 2004/0250934 A1 | 12/2004 | Hamdan | |
| 2005/0205185 A1 | 9/2005 | Reiter et al. | |
| 2006/0102263 A1 | 5/2006 | Kikuchi et al. | |
| 2007/0203260 A1* | 8/2007 | Okamatsu | B29C 73/163 523/166 |
| 2013/0319085 A1 | 12/2013 | Schwab et al. | |
| 2015/0251502 A1 | 9/2015 | Brushaber | |

FOREIGN PATENT DOCUMENTS

| | | | |
|---|---|---|---|
| CN | 101311692 A | | 11/2008 |
| CN | 201205851 Y | | 3/2009 |
| CN | 204055999 U | | 12/2014 |
| DE | 29918099 | * | 2/2000 |
| DE | 102007031274 | * | 1/2009 |

(Continued)

OTHER PUBLICATIONS

Machine translation of JP 2005-153785, 2005.*

(Continued)

*Primary Examiner* — Justin R Fischer
(74) *Attorney, Agent, or Firm* — Shaun J. Fox; J. Gregory Chrisman

(57) ABSTRACT

Tires having a magnetic tire sealing material containing magnetic particles are described for detecting the presence of one or more sealed punctures in the tire. The tires can have a sealed tire portion that is formed by the magnetic tire sealing material flowing into and filling a puncture in the tire. The sealed tire portion includes a portion having magnetic particles and the portion being at the outer surface of the tire such as in the tread area. The tire can be positioned within the detection zone of an apparatus capable of detecting magnetic particles to indicate whether the tire contains a sealed puncture filled with the magnetic tire sealing material.

7 Claims, No Drawings

(56) References Cited

FOREIGN PATENT DOCUMENTS

| | | | |
|---|---|---|---|
| FR | 2645799 | * | 10/1990 |
| JP | 2005-153785 | * | 6/2005 |
| JP | 2010-159371 | * | 7/2010 |
| JP | 2010194957 A | | 9/2010 |
| WO | WO 2014/124349 | * | 8/2014 |

OTHER PUBLICATIONS

Machine translation of JP 2010-159371, 2010.*
Korean Abstract 792548, 2008.*
Machine translation of FR 2645799, 1990.*
Machine translation of KR 792548, 2008.*
Translation of KR 100792548, 2008.*
Machine translation of DE 102007031274, 2009.*
http://www.coloradolandtire.com/tire-dictionary.html.

* cited by examiner

MAGNETIC TIRE SEALANT FOR PUNCTURE DETECTION

TECHNICAL FIELD

The present disclosure relates to pneumatic tires having a magnetic tire sealant material for sealing a puncture, and more particularly, pneumatic tires having sealed tire area formed from the magnetic tire sealant material and a portion of the sealed tire area being present at the outer surface of the tire for using an apparatus to detect the sealed puncture.

BACKGROUND

Tires are generally still operable after a puncture because an object that passes through a tire often does not easily come out and air does not leak rapidly from the tire. However, over a long period of run time, the object is exposed to centrifugal forces caused by the rotation of the tire that can dislodge the object. When the object comes out, air quickly leaks from the tire and operation of a vehicle can become dangerous. To combat punctures, modern puncture-sealing pneumatic tires provide a sealant material that prevents the leakage of air when a foreign object, for example, a nail on a roadway surface, penetrates through the tire during operation.

The sealant layer is often formed of a thin viscous rubber layer adhered integrally to an inner peripheral surface of the tire at the backside of the tread portion. When a foreign object falls out of a puncture and forms an opening, the same centrifugal forces caused by the rotation of the tire that dislodged the object result in the viscous sealant layer to flow into the puncture opening. The sealant layer fills and preferably closes the puncture opening to result in the tire being air-tight for continued use.

A tire having a sealed puncture can continue to be used without the puncture area being noticed by a driver. There is an interest, however, that a sealed puncture be detected to notify the driver of a possible defect. It is an objective of the present disclosure to overcome one or more difficulties related to the prior art. It has been found that a magnetic tire sealant material can be used to detect a sealed puncture on the outer surface of the tire and that an external apparatus can be used to indicate such a sealed puncture.

SUMMARY

In a first aspect, there is a pneumatic tire that includes an outer surface; a magnetic tire sealing material arranged in an interior portion of the tire, the sealing material underlying the outer surface of the tire and the sealing material containing magnetic particles; wherein a puncture of the outer surface of the tire that contacts the sealing material is sealed by the sealing material flowing in the puncture to form a sealed tire area that includes a portion the sealing material, the sealed tire area is present at the outer surface of the tire, and a portion of the magnetic particles of the sealing material is present in the sealed tire area at the outer surface of the tire.

In an example of aspect 1, the magnetic particles are present up to 5 weight percent of the total weight of the sealing material in the tire.

In another example of aspect 1, the magnetic particles are present in the range of 0.1 to 5 weight percent of the total weight of the sealing material in the tire.

In another example of aspect 1, the magnetic particles are a ferrite, metal oxide or a combination thereof.

In another example of aspect 1, the magnetic particles are selected from the group consisting of $Fe_2O_3$, $CoOFe_2O_3$, $Fe_3O_4$, $\gamma\text{-}Fe_2O_3$, strontium ferrite, barium ferrite, and combinations thereof.

In another example of aspect 1, the magnetic particles are nanoparticles.

In another example of aspect 1, the magnetic particles have an average particle diameter in the range of 5 nanometers to 100 nanometers.

In another example of aspect 1, the sealed tire area is substantially air tight to prevent leakage of air from inside the pneumatic tire through or around the sealed tire area present at the outer surface of the tire.

In another example of aspect 1, the sealed tire area at the outer surface of the tire has a greater average concentration of magnetic particles than the average concentration of magnetic particles over the remaining outer surface of the tire.

In another example of aspect 1, the sealed tire area at the outer surface of the tire has a stronger average magnetic field than the average magnetic field over the remaining outer surface of the tire.

In another example of aspect 1, the sealing material forms two or more sealed tire areas at the outer surface of the tire.

In another example of aspect 1, the sealing material is located under a tread area in a crown portion of the tire.

The first aspect may be provided alone or in combination with any one or more of the examples of the first aspect discussed above.

In a second aspect, there is a method of detecting the presence of a sealed puncture in a pneumatic tire, the method includes positioning the tire within a detection zone of an apparatus for detecting magnetic particles, the tire includes an outer surface and a magnetic tire sealing material containing magnetic particles, the sealing material arranged in an interior portion of the tire, a portion of the sealing material underlying the outer surface of the tire and a portion of the sealing material forming a sealed tire area at the outer surface of the tire; operating the apparatus to detect the presence of the magnetic particles in the sealed tire area at the outer surface of the tire, the detection of the magnetic particles of the sealing material at the outer surface of the tire indicating that the tire contains a sealed puncture.

In an example of aspect 2, the detection zone is a magnetic field detection zone.

In another example of aspect 2, the apparatus is capable of measuring a magnetic field.

In another example of aspect 2, the sealed tire area is formed by the sealing material flowing in an open puncture, and the open puncture extends from the outer surface of the tire to the sealing material underlying the outer surface of the tire, the sealing material flows and fills the open puncture to create a sealed puncture and a sealed tire area at the outer surface of the tire.

In another example of aspect 2, the sealed tire area at the outer surface of the tire has a greater average concentration of magnetic particles than the average concentration of magnetic particles over the remaining outer surface of the tire.

In another example of aspect 2, the sealed tire area at the outer surface of the tire has a stronger average magnetic field than the average magnetic field over the remaining outer surface of the tire.

In another example of aspect 2, the sealed tire area at the outer surface of the tire is in a tread portion of the tire.

In another example of aspect 2, the magnetic particles are present up to 5 weight percent of the total weight of the sealing material in the tire.

The second aspect may be provided alone or in combination with any one or more of the examples of the second aspect discussed above, or with any one or more of the examples of the first aspect.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the specification as aspects.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

The term "phr" means parts per hundred parts of rubber by weight, and is a measure common in the art wherein components of a composition (i.e. sealant material) are measured relative to the total of all of the elastomer (rubber) components. The total phr or parts for all rubber components, whether one, two, three, or more different rubber components are present in a rubber composition are defined as 100 phr. Other non-rubber components are generally proportional to the 100 parts of rubber and the relative amounts may be expressed in phr.

The present disclosure relates to a magnetic tire sealing material or sealant material, used interchangeably herein, for use in tires. The sealing material has a relatively high viscosity and is desirably not significantly influenced by heat, and therefore the material can be generally free from flowing and accumulation during running, even when a cover layer or a flow preventing wall is not used. Moreover, the viscous sealant material adheres tightly to foreign objects that penetrate through a tire, and even when a puncture opening formed through a tire by the penetration of a foreign substance is enlarged during the running of the tire and the foreign object dislodges through the enlarged opening, the foreign object can pull the viscous sealant material, which is tightly adhered to the foreign object, into the opening and fill the hole to keep the tire completely air-tight thereby forming a sealed tire area.

The magnetic tire sealing material can be present in the tire and preferably underlies the outermost surface of the tire, for example, the ground-contacting tread surface, the tread shoulder area or exposed outer sidewall surface. Underlying the outer surface of the tire can include the sealant material being positioned between one or more component layers of the tire or the sealant may be directly exposed to the air within the tire body. For example, the sealing material can be positioned in the tire between an inner liner layer and the carcass. The inner liner layer can be the innermost layer of the tire opposite its outer surface (i.e. the air barrier layer). In another example, the sealing material can be positioned on the outermost or innermost surface of an inner liner layer. In the case of it being positioned on the innermost surface, the sealing material can be directly exposed to the air within the tire and can function as the air barrier layer or a portion thereof, whereas when it is positioned on the outermost surface of an inner liner layer, it may be between two adjacent inner liner layers or the inner liner layer and the next adjacent layer, e.g., a sidewall, belt assembly, ply, or base rubber layer underlying the tread and optionally a portion of the shoulders.

As described herein, the sealant material is a component in a self-sealing pneumatic tire. As arranged in the tire, it is contemplated that the tire has conventional components or portions, for example, a tread cap, a tread portion, rubber base layer, sidewalls, a support carcass, beads or bead portions, a belt or belt assembly, one or more plies, an inner liner that may or may not form an air barrier layer and the like.

Generally, the tire components are related to one another in the following arrangement. The sidewalls taper radially inward from the shoulder region of the tread portion to the beads or bead portions, wherein a carcass underlies the tread portion and sidewalls to provide a support structure. An inner liner layer underlies the carcass and the sealant material can be in direct contact with the inner liner layer. The outer surface of the tire, and in particular, the tread cap or portion is adapted to be ground contacting during operation.

Positioned as a component in the tire, the sealing material can be present as a layer arranged in an interior portion of the tire. The thickness of a layer composed of the sealant material can be any suitable amount to impart sufficient puncture sealing capability to the tire. The layer, for example, in an unvulcanized form, can have a thickness in the range of 0.15 to 2 cm, 0.2 to 1.5 cm, 0.3 to 1.2 cm, 0.4 to 1 cm, or 0.5, 0.6, 0.7, 0.8 or 0.9 cm. In a general passenger tire, the layer can preferably have a thickness of 0.3 to 1 cm.

The sealant material can be any suitable shape or size to provide protection from punctures. For instance, the sealant material can extend over various areas of an interior portion of the tire. In an example, the sealant material is positioned in the crown region from shoulder to shoulder. In another example, the sealant material is positioned in one or both shoulder regions and can further extend to adjacent areas of the tire, such as the sidewall area or a portion thereof. In yet another example, the sealant material is positioned from bead to bead or sidewall to sidewall in an interior portion of the tire. Preferably, at least a portion of the sealant material provides puncture protection to the tire crown region.

In addition to being able to seal punctures in a tire, the tire sealing material contains particles to provide a magnetic property to the tire, and particularly, to a puncture area. The tire sealing material preferably contains magnetic particles. The magnetic particles and other components of the sealing material are described below.

The tire sealing material can include those known in the art, for example, as disclosed in U.S. Pat. Nos. 3,952,787; 4,090,546; 4,228,839; 4,396,053; 4,445,562; 4,548,687; 4,607,065 and 6,194,485. The present disclosure includes tire sealing materials that contain magnetic particles to render the tire sealing materials magnetic.

The sealing material can be prepared as known in the art, for example, as described in the above-noted patent disclosures. For example, various ingredients of the sealant material can be mixed together using convenient rubber mixing equipment, such as an internal rubber mixer. The material generally has a high enough viscosity and tack (in its unvulcanized form) to accommodate its placement in an unvulcanized tire without significantly departing from conventional tire building techniques.

As noted above, the magnetic tire sealing material includes magnetic particles, for example, magnetic particles that impart a magnetic property to the material. Magnetic particles can be used interchangeably with magnetic powder herein. The shape of the particles can be spherical, needle shaped or needle like, plate-like or hexagonal or appear flaky or irregular. The magnetic tire sealant material can include 0.1 to 10 phr, 0.2 to 8 phr, or 0.3 to 6 phr of magnetic particles or less than 2 phr, 3 phr, 4 phr or 5 phr of magnetic particles. In another example, the magnetic particles can be present up to 5 weight percent of the total weight of the sealant material, or in the range of 0.1 to 5, and preferably 0.2 to 2 weight percent of the total weight of the sealant material.

The magnetic particles are preferably well dispersed in the magnetic tire sealant material, for example, by mixing the magnetic particles with components of the material. The mixing or stirring conditions may be appropriately selected so as to form a uniform distribution of the magnetic particles in the material. For example, the sealant materials can be obtained by mixing the rubbers and other components with the magnetic particles and other fillers, such carbon black, tackifiers, resins, curing agents, rubber auxiliaries or the like in conventional mixers, such as rollers, internal mixers and mixing extruders. The viscous magnetic tire sealant material is capable of flowing into a puncture opening to seal a tire and in the process the material forms a sealed tire area at the outer surface of the tire, e.g., the tread. A uniform distribution of the magnetic particles in the sealing material can provide a portion of the magnetic materials being present at the outer surface of the tire in the sealed tire area. Presence of magnetic particles at the outer surface of the tire can be detectable by various apparatuses to indicate whether a tire has been punctured.

The data from the apparatus can be recorded to create a report for the tire, e.g., an inspection report. Other data such as abnormally high concentrations or accumulation areas of magnetic particles can also be detected, which may be the result from a foreign object passing into or through the sealant material. The detection of high concentrations or accumulation of magnetic particles can be below the outer surface of the tire.

The magnetic particles of the sealant material can include ferrite magnets, rare earth magnets, for example those including samarium or neodymium, metal, iron or ferrite oxides, for example, gamma iron oxide and magnetite, metals or metal alloys, cobalt or chromium dioxide, strontium ferrite, barium ferrite, manganese zinc ferrite, nickel zinc ferrite, copper zinc ferrite, neodymium iron boride or combinations thereof. The magnetic particles can also be a mixed oxide, for example of at least two metals such as iron, cobalt, nickel, tin, zinc, cadmium, manganese, copper, barium, magnesium, lithium or yttrium.

In one embodiment, the magnetic particles can include $Fe_2O_3$, $CoOFe_2O_3$, $Fe_3O_4$, $\gamma\text{-}Fe_2O_3$, strontium ferrite, barium ferrite, and combinations thereof.

The magnetic particles can have an average particle size in the range of 0.1 to 10, 0.2 to 5 or 0.3 to 2 microns. The average particle size of the magnetic particles can be less than 5, 3, 2, 1 or 0.5 micron. In one embodiment, the magnetic particles can be nanoparticles, for example, the average particle size of the magnetic nanoparticles can be in the range of 5 to 100 nanometers (nm), or less than 80, 60, 40, 20 or 10 nm.

The magnetic particles can have a residual induction (Br value) of more than 100 G (Gauss), more than 1,000 G, more than 1,500 G, more than 1,750 G or more than 2,000 G. The magnetic particle can have a coercive force (HcB) of more than 2,000 Oe or more than 3,000 Oe. The magnetic particles can have a compressed density of more than 1.5 $g/cm^3$, more than 2 $g/cm^3$, more than 2.5 $g/cm^3$ or more than 3 $g/cm^3$.

The magnetic tire sealing material can include one or more elastomers. Exemplary elastomers include, without limitation, natural rubber, styrenebutadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, ethylene propylene diene rubbers, chlorosulphonated polyethylene, fluorinated hydrocarbons, combinations thereof and the like. The terms elastomer and rubber will be used interchangeably in this specification.

In one embodiment, the magnetic tire sealing material can include at least one high molecular weight elastomer. The high molecular weight elastomer of the present disclosure can be any high molecular weight elastomer capable of being cross-linked. For example, the high molecular weight elastomer can include ethylene-propylene-diene terpolymers, polybutadiene, partially hydrogenated polybutadiene, butyl rubber, halo butyl rubber for example chloro- or bromo-, acrylonitrile-butadiene copolymer, styrene butadiene copolymer, natural rubber, or cis polyisoprene and the like. Mixtures of two or more of the above elastomers can also be used, as can various other conventional high molecular weight rubbers. The number average molecular weight of the high molecular weight elastomer can be at least 50,000, and preferably at least 100,000.

Ethylene propylene diene elastomers are preferred. Ethylene propylene diene elastomers are desirable for applications that involve heat, weathering and chemical exposure as well as long term aging. The elastomers can advantageously resist becoming brittle with age and can flex and accommodate changes in temperature. In one example, elastomers of this type can be terpolymers of ethylene and propylene, and a non-conjugated diene. Such elastomers can be highly extendable, allowing high levels of fillers and plasticizers to be added while maintaining desirable physical properties.

In another embodiment, the magnetic tire sealing material can include a polymer of relatively low molecular weight, for example, those having a number average molecular weight of about 500 to about 5,000 and which often are liquids at room temperature (that is 20° C. to 25° C.).

Various structural types of low molecular weight polymers, preferably in liquid form, can include ethylene-propylene copolymer, ethylene-propylene-diene terpolymer, polybutadiene, hydrogenated polybutadiene, butyl rubber, polypropylene (e.g., atactic), acrylonitrile-butadiene copolymer, styrene-butadiene copolymer, synthetic polyterpenes, thermoplastic olefins, pentaerythritol esters of hydrogenated rosins, triethylene glycol esters of hydrogenated rosins, vinyl toluene copolymers, alkyl aromatics, depolymerized natural rubber, polybutenes and combinations thereof. Because of their cost, availability and properties the polybutenes are desirable.

Example polybutenes can have a number average molecular weight exceeding 1,000, which can reduce migration into adjacent tire components. Polybutenes are available under the trademark Indopol, e.g. Indopol H-300 and Indopol H-1900. The Indopol grades are reported to have a polymer backbone structure resembling isobutylene and that the Indopol H-300 and Indopol H-1900 have viscosities ranging from 627-675, to 4069-4382 centistokes, respectively at 210° F. The number average molecular weights (Mn) of the same materials is respectively from 1,290 to 2,300, as determined by vapor pressure osmometry.

The magnetic sealant material can include a combination of low molecular weight polymer and high molecular weight elastomer. For example, in general, from 55 to 90 phr of the magnetic sealant material can be low molecular weight polymers with from 65 or 70 phr to 90 phr being preferred. The amount of the high molecular weight elastomer in the sealant accordingly can be from 10 to 45 phr with from 10 phr to 15, 20, 25 or 30 phr being preferred.

Additionally, other ingredients which can be utilized to prepare the magnetic tire sealant material include one or more reinforcing agents. A suitable agent includes finely divided carbon, such as carbon black as known in the art. Carbon black fillers can include all conventional carbon blacks, for example the HAF, ISAF and SAF type are suitable. Other examples of carbon black include of ASTM 300, 600 or 700 grade (e.g., N326, N330, N550). Other suitable reinforcing agents include zinc oxide, aluminum hydrate, lithopone, whiting, clays, hydrated silicas, calcium silicates, silicoaluminates, magnesium oxide, and magnesium carbonate. The amount of such reinforcing agents is from 0.1 to about 20 phr, and desirably from 1 to 20 or 1 to 10, or 5 phr.

The magnetic sealant material can include a resin, which can include at least one adhesive resin. It is contemplated that any resin known by those of skill in the art to be compatible with the elastomers can be contained in the magnetic sealant material and may be used with one or more embodiments of the present disclosure. As may be appreciated by those of skill in the art, a variety of different adhesive resins or tackifying additives may be used to practice the present disclosure. In one example, suitable resins can show a differential scanning calorimetry (DSC) glass transition temperature Tg between 30° and 60° C. and a Ring and Ball softening point between 80° and 110° C.

Multiple adhesive resins can be included in the resin, such as a mixture of phenolic resins. Adhesive resins can include resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof. Resins can further include petroleum hydrocarbon resin tackifiers such as aliphatic petroleum resin, aromatic petroleum resin (e.g., a C5-C9 aromatic modified hydrocarbon resin), alicyclic petroleum resin and the like, or natural tackifiers. The adhesive resin or combination of resins can be present in the magnetic sealant material in a range of 0.5 and 10 phr, 1 and 8 phr or less than 6, 5, 4 or 3 phr.

The degree of crosslinking achieved with this or other curing systems is such as to prevent general flow of the sealant material at the high temperature experienced in the running tire and to provide the sealant with sufficient resiliency for proper sealant performance in the presence of an opening. Crosslinking ingredients are included in the sealant material when the one or more crosslinkable elastomer materials is of a type that crosslinks on exposure to vulcanization temperatures. Examples of such vulcanization agents are the standard accelerators utilized in the rubber industry; such as Santocure NS (N-Tert-butyl-2-benzothiazolesulfenamide), mercaptobenzothiazole, tetramethylthiunam disulfide; peroxides, such as dicumyl peroxide; and sulfur. It is preferable to use a crosslinking agent from the quinones class, for example a quinine dioxime, such as paraquinone dioxime. The incorporation of stearic acid and zinc oxide to assist in the crosslinkage reaction, as is known, is also contemplated. When present, the cross-linker or accelerator should be from 0.02 to 2.5 phr, the sulfur from 0.1 to 5 phr, the zinc oxide from 0.2 to 10 phr, the stearic acid from 0.1 to 5 phr and the peroxide from 1.0 to 10 phr.

The compositions of the present disclosure may further include, if desired, various appropriate additional compounding ingredients, e.g., pigments, extenders, surfactants, stabilizers and anti-oxidants.

The sealing material can also be assembled with other tire components as conventionally known in the art and be further vulcanized together with the other components to form a pneumatic tire. For instance, subsequent to the unvulcanized pneumatic tire including the sealant material is assembled, the tire and its components are vulcanized using a normal tire cure cycle, which can include a range of temperatures. In an example, a tire (e.g., a passenger tire) can be cured at a temperature in the range of 130° C. to 170° C. The tire can be cured for a period of time as conventional in the art, for example, in a range of 10 to 45 minutes or more. The length of the cure period can be dependent on the tire size and degree of desired depolymerization of the rubber contained therein. The cure period can also be affected by the thickness of the component layers themselves (e.g., the sealant material).

During use, the sealing material can fill an opening or puncture in the tire such that a portion of the sealing material flows to the outer surface of the tire thereby exposing the components of the sealing material at the outer surface of the tire, for example, in a sealed tire area. That is, when the sealant material contains magnetic particles, and the sealant material flows through a puncture opening in the tire, the sealant carries the magnetic particles with the flow and results in magnetic particles being present at and on the outer surface of the tire in a sealed tire area. Prior to the sealant material flowing to the outer surface of the tire, the outer surface would have a base or baseline magnetic field and a baseline low or non-existent concentration of magnetic particles. Thus, when the magnetic particles of the sealant material are in an interior portion of the tire and not at the outer surface, the outer surface of the tire should not contain uncharacteristic magnetic field peaks or readings above the baseline magnetic field or concentration of magnetic particles. The magnetic particles of the sealant material at the outer surface of the tire can be detected by an apparatus to indicate that the tire was punctured or damaged and that the sealant material has filled the puncture or other damage by flowing to the surface of the tire. The detected magnetic field or magnetic particles can correspond to a reading and the readings can be compared to baseline values for indicating the present of sealant material near or at the outer surface of the tire.

Magnetic particles of at the outer surface of the tire can be detected by any suitable apparatus, for example, an apparatus that can detect the presence of a magnetic field or magnetic particles. As noted above, the detection of a magnetic field or magnetic particles by the apparatus can be compared to a baseline value for the outer surface of the tire, which can be pre-programmed into the apparatus. Measurements can be stored in the apparatus, which can be linked to a computer system to generate an inspection report of the tire.

Examples of the apparatus include a meter, gauge, sensor, recorder or other instrumentation. Further examples of apparatuses that can be used to detect the presence of magnetic field or particles at the outer surface of the tire include hand-held devices, magnetoresistive instruments, gaussmeter (DC/AC, milli, Hall-effect, kilo), magnet, magnaprobe, magnetometer (scalar, vector), geomagnetometer, modified cellular devices, and the like. In another example, Xray, e.g., an Xray machine, can be used to detect the movement of magnetic particles or presence at the outer surface or a CT scanner can also be used. The apparatuses preferably can record the detection of the magnetic particles or magnetic field to document the presence of magnetic particles at the outer surface of the tire.

In one embodiment, the apparatus capable of detecting magnetic particles or a magnetic field has a detection zone. The detection zone is the area around the apparatus that registers a change or value of a magnetic field or presence of magnetic particles. Thus, the apparatus can be moved near and around the tire (e.g., the outer surface) such that the detection zone of the apparatus includes a portion or the entire outer surface of the tire for detecting a magnetic field or magnetic particles on the tire surface. Alternatively, the tire can be moved within the detection zone of a stationary or fixed apparatus for indicating whether the tire has a sealed puncture. For example, one or more apparatuses can be secured in place, such as on a detection plate or station, and a tire can be rolled into an inspection area that positions the tire in the detecting field of the one or more apparatuses so the tire can be inspected for punctures by registering a change in magnetic field or presence of magnetic particles.

In another embodiment, the magnetic particles in the sealant material in the tire can be activated to result in magnetism in the material. The particles being in the presence of a magnetic field or metal object penetrating the tire can result in magnetism of the material. For example, a metal shard, metal object or metal nail can puncture a tire and come into contact with the sealant material thereby activating magnetism in the sealant. As the metal object is brought into contact with the sealant material having dispersed magnetic particles, the local concentration of magnetic particles in the sealant material near the object increases, for example, beyond the percolation threshold, which can generate an increased magnetic field (see Phioppova, O. et al., European Polymer Journal, 47 (2011) P542-559). The difference in magnetic field strength within the sealant material in the tire could be a variable or indicator useful for rapidly identifying potential puncture or damage points within a tire, for instance, with an apparatus capable of detecting magnetic fields as described herein.

The activated magnetism in the sealant material can be further detected by an apparatus to indicate the presence of a foreign object or a sealed puncture, e.g., with one of the apparatuses noted above. In an example, the magnetic particles can be superparamagnetic particles such as magnetite, hematite or some other compound containing iron that becomes magnetized only in the presence of a metal or magnetic field. In another example, the magnetic particles can be as mentioned earlier in the disclosure, e.g., $CoOFe_2O_3$ or iron oxide. Preferably the magnetic particles are nanoparticles, for example, particles having an average diameter in the range of 5 to 100 nanometers or 10 to 80 nanometers.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method of detecting the presence of a sealed puncture in a pneumatic tire, the method comprising:
   a. positioning the tire within a detection zone of an apparatus for detecting magnetic particles, the tire comprising an outer surface and a magnetic tire sealing material comprising magnetic particles present in the range of 0.1 to less than 5 phr in the magnetic tire sealing material, the sealing material arranged in an interior portion of the tire, a portion of the sealing material underlying the outer surface of the tire and a portion of the sealing material forming a sealed tire area at the outer surface of the tire;
   b. operating the apparatus to detect the presence of the magnetic particles in the sealed tire area at the outer surface of the tire, the detection of the magnetic particles of the sealing material at the outer surface of the tire indicating that the tire contains a sealed puncture.

2. The method of claim 1, the detection zone being a magnetic field detection zone.

3. The method of claim 1, the apparatus being capable of measuring a magnetic field.

4. The method of claim 1, the sealed tire area being formed by the sealing material flowing in an open puncture, the open puncture extending from the outer surface of the tire to the sealing material underlying the outer surface of the tire, the sealing material flows and fills the open puncture to create a sealed puncture and a sealed tire area at the outer surface of the tire.

5. The method of claim 1, the sealed tire area at the outer surface of the tire having a greater average concentration of magnetic particles than the average concentration of magnetic particles over the remaining outer surface of the tire.

6. The method of claim 1, the sealed tire area at the outer surface of the tire having a stronger average magnetic field than the average magnetic field over the remaining outer surface of the tire.

7. The method of claim 1, the magnetic particles being present less than 2 weight percent of the total weight of the sealing material in the tire.

* * * * *